United States Patent [19]

Fahlstrom

[11] 4,344,250
[45] Aug. 17, 1982

[54] METHOD FOR TREATMENT OF WOOD USING A REACTIVE CLOSURE MEANS TO PROVIDE A TIME DELAYED RELEASE OF THE TREATING AGENT

[75] Inventor: George B. Fahlstrom, Mission Viejo, Calif.

[73] Assignee: Osmose Wood Preserving Co. of America, Inc., Buffalo, N.Y.

[21] Appl. No.: 215,034

[22] Filed: Dec. 10, 1980

[51] Int. Cl.³ .............................................. A01G 7/06
[52] U.S. Cl. ..................................... 47/57.5; 47/48.5
[58] Field of Search ......................... 47/57.5, 58, 48.5

[56] References Cited

U.S. PATENT DOCUMENTS

| | | | |
|---|---|---|---|
| 1,999,458 | 4/1935 | Hollister | 47/57.5 |
| 3,367,065 | 2/1968 | Cravens | 47/57.5 |
| 3,691,683 | 9/1972 | Sterzik | 47/57.5 |
| 3,706,161 | 12/1972 | Jenson | 47/57.5 |

FOREIGN PATENT DOCUMENTS

| | | | |
|---|---|---|---|
| 891350 | 3/1944 | France | 47/57.5 |
| 394162 | 6/1933 | United Kingdom | 47/57.5 |

*Primary Examiner*—Robert E. Bagwill
*Attorney, Agent, or Firm*—Christel, Bean & Linihan

[57] ABSTRACT

An improved method of applying a chemical treatment agent to a wood structure characterized by the conventional steps of forming a hole in a wood object, and inserting a container enclosing the treatment agent into the hole. The improvement comprises sealing the container with a suitable closure means fabricated out of a material which undergoes an interaction with the chemical treatment agent or its vapors. When the sealed container carrying the chemical treatment agent is inserted within the prepared hole, and when the hole is thereafter plugged such that the sealed container is substantially confined within the wood structure, the treatment agent and/or its vapors degrade or dissolve the closure means thereby providing an opening through which the chemical agent and its vapors are released into the internal structure of the wood object.

16 Claims, 4 Drawing Figures

METHOD FOR TREATMENT OF WOOD USING A REACTIVE CLOSURE MEANS TO PROVIDE A TIME DELAYED RELEASE OF THE TREATING AGENT

BACKGROUND OF THE INVENTION

The present invention relates to an improved method for treating wood. More particularly, the present invention relates to a method for packaging, dispensing and introducing a chemical agent into the internal structure of wood.

Wood products such as utility poles for electric and telephone transmission wires, piling supports for highway and railroad bridges, marine piles supporting a dock or wharf over water, and solid or laminated wood building structural components are all subject to attack by wood destroying fungi (wood rot) and insects (termites). Frequently, such attack is unnoticed externally but can be extensive internally. One method of combatting such destruction is by the internal application of a chemical agent which is toxic to the wood destroying organisms. Unfortunately, the chemical agent chosen is usually not only toxic to destructive organisms, but is also toxic to man, animals, and the environment as well. The utilization of such chemical treatment agents also presents a severe hazard to those personnel who must handle the toxic chemicals. In addition, where wood pilings are to be the subject of treatment, there is the additional danger of environmental contamination occurring when the treatment agent seeps or spills into the waterway within which the piling is located. Moreover, the conspicuous unattended, application of a chemical fluid to a wood structure over an extended period of time may be interrupted by tampering on the part of children or animals, resulting in their exposure to potentially toxic chemicals.

Presently, there are several known devices used to implement the introduction of a chemical treatment agent into the internal environment of a wood object. These devices enclose the desired toxic chemicals, and when properly inserted into a pre-formed cavity, the chemicals are released by mechanical means. One such example is illustrated by U.S. Pat. No. 3,367,065 wherein the container of toxic material is placed within a prepared cavity located within the interior of a tree. The container is sealed within the tree utilizing a retaining plug having a puncturing means on its inner end. When the retaining plug is impacted into its final position, the end of the container is punctured releasing the contents into the tree interior.

U.S. Pat. No. 3,691,683 discloses a method wherein a cartridge which is at least partially filled with the chemical treating agent is knocked into the tree trunk, by some mechanical means. This method involves shattering the cartridge end under sufficient impact to generate an overpressure in the cartridge for injecting the chemical treating agent into the tree. Such a shattering technique, however, involves an additional element of risk in the event shattered pieces of the cartridge come in contact with personnel impacting the device. Therefore, a demand still remains in the industry today for a method of treating a wood structure with a toxic chemical wherein the risk factors are significantly reduced.

SUMMARY OF THE INVENTION

Accordingly, it is a primary object of the present invention to provide an improved method for the internal treatment of a wood structure which provides for the controlled release of an adequate quantity of the chemical treatment agent over a period of time.

It is a further object of the present invention to provide a method for the internal treatment of a wood structure wherein the chemical agent is not exposed to the surrounding environment during its introduction into the wood structure.

It is a further object of the present invention to provide a method for the internal treatment of a wood structure wherein the person or persons responsible for applying the treatment are not exposed to the treatment agent during its introduction into the wood structure.

It is a further object of the present invention to provide a method for treating the interior of a wood structure which does not significantly damage the wood.

It is a further object of the present invention to provide an improved method for the internal treatment of a wood structure which is inconspicuous to the casual observer.

It is a further object of the present invention to provide an improved method for the internal treatment of a wood structure which enables a selective dose or quantity of the chemical agent to be applied internally to the wood structure, and wherein the application of this chemical agent can be carried out simply, quickly and economically.

It is a further object of the present invention to provide an improved chemical packaging container which is useful for the internal treatment of a wood structure.

In one aspect thereof, the improved method of treating a wood structure according to the present invention is characterized by the conventional steps of forming a hole in the wood object, and inserting a container enclosing the treatment agent into the hole. The improvement comprises sealing the container with a suitable closure means which is fabricated out of a material which undergoes an interaction with the chemical treatment agent or its vapors. When the sealed container carrying the chemical treatment agent is inserted within the prepared hole, and when the hole is thereafter plugged such that the sealed container is substantially confined within the wood structure, the treatment agent and/or its vapors degrade or dissolve the closure means thereby providing an opening through which the chemical treatment agent and its vapors are released into the intended internal structure of the wood without the application of any external force.

The foregoing and additional advantages and characterizing features of the present invention will become clearly apparent upon a reading of the ensuing detailed description together with the included drawing wherein:

DETAILED DESCRIPTION OF THE DRAWING

Figure 1:
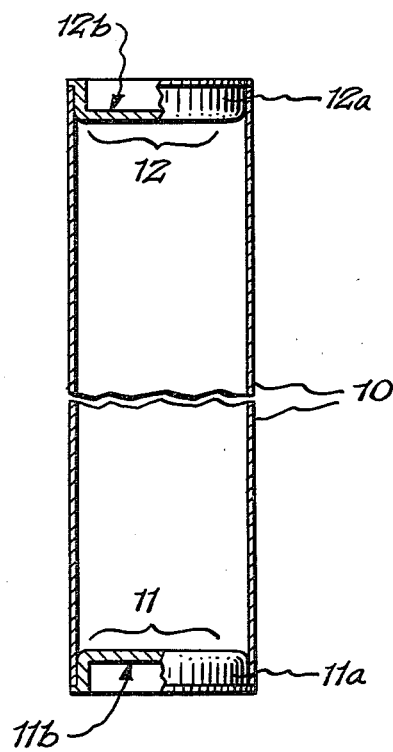
FIG. 1 is an elevated, fragmentary, vertical cross sectional view of one embodiment of the sealed container.

Referring now to FIG. 1, the method of treatment according to this invention utilizes a hollow tube container 10 of any desired size and shape. The dimensions are governed by the requirements of the specific application. In FIG. 1, the tube container is open at both ends. Closure means 11 and 12 have recessed center portions (11b and 12b) and are of a sufficient size and shape to be partially or completely received within the hollow end sections of container tube 10, forming a plug or stopper for each end which fits essentially flush against the inner circumference of the container end section to provide an essentially air tight seal at each end of the container.

Critical to the successful utilization of this treatment method is the selection of the proper combination of materials used to fabricate both the container and the closure means in relation to the specific chemical properties of each individual component or combination of components used in the treatment agent to be enclosed therein.

In a preferred embodiment, hollow container 10 is made out of a material which is resistant to chemical degradation or solubilization by the chemical components enclosed, while at least one of the closure means 11 or 12 (or both) is fabricated out of a material which undergoes an interaction with one or more of the enclosed components or in the vapors of one of the components of the treatment agent.

The type of interaction which occurs will depend on the specific chemical ingredients which are utilized in each combination. At times the interaction will be a dissolution reaction wherein the closure means is soluble in the treatment solution. In other cases the interaction will involve a chemical reaction wherein the closure means undergoes a degradation or disintegration process.

When the proper combination of materials is used, and the container is filled or partially filled with the desired chemical treatment agent, sealed, and thereafter placed at the treatment site, either the treatment agent itself or its vapors spontaneously begin to dissolve or disintegrate the closure means, thereby creating an opening or passage out of the container through which the chemical treatment agent and its vapors are released into the wood.

The selection of materials to be used in fabricating the container and closure means will vary depending upon the exact chemical properties of the particular treatment agent. If several chemicals are to be combined or if a solvent or diluent is to be added, then the chemical properties of the additional ingredients must also be considered. The chemical treatment composition may be a water soluble mixture, or it may be an emulsion comprised of agents such as fungicides, insecticides or plant nutrient compositions commonly used for treating trees and other wood structures. In most instances, the selection of a suitable chemically soluble or degradeable material for use in making the closure means will be determined by a process of trial and error, and in some instances such a material may not as yet be known or available.

Container 10 may be formed of any suitable thin or thick walled material such as sheet metal, but in the preferred form, it would comprise a clear, rigid material which permits the determination of the amount of chemical agent contained therein by visual inspection. Any material will do as long as it is essentially non-reactive and non-soluble when in contact with any component of the chemical treatment agent or its vapors. Examples of suitable materials are the following: glass, or solvent/chemical resistant plastics such as, but not limited to, acetal homopolymers, diallylphthalate, cellulose acetate, nylon, polyethylene, polypropylene and polyethylene/ethylene copolymers.

The chemically reactive cap or closure means, 11 or 12, must be fabricated out of a suitable material capable of undergoing dissolution or degradation in the liquid or vapor phase of one or more the components of the chemical treatment composition. Plastics, such as, but not limited to the following, are examples of suitable fabrication materials for the closure means: acrylics, cellulosic materials such as cellulose acetate butyrate and cellulose propionate, polycarbonate, and polystyrene for organic treatment solutions, and polyvinyl alcohol for water based treatment solutions.

Certain plastics are known to undergo a dissolution reaction when brought into contact with solvent diluents such as ketones, esters, or chlorinated hydrocarbon solvents. These plastics would also be suitable for use in the end closure means, provided such a diluent is incorporated into the chemical treatment agent as one of its components.

Where the treatment solution is water soluble, polymer resins soluble in water may also be employed to fabricate the closure means. This list is by no means exhaustive as the selection of a suitable chemo-degradeable cap or plug is dependent upon the behavior of each individual chemical with each individual packaging material.

Many chemical treating agents and fumigants are known which are suitable for use with the packaging materials described above. Examples of such agents include: Sodium N-methyldithiocarbamate, methyl isothiocyanate and methyl isothiocyanate combined with chlorinated $C_3$ hydrocarbons, cis-N-[1,1,2,2,tetrachloroethyl)thio]-4-cyclohexene-1,2-dicarboximide, chloropicrin (trichloronitromethane), aluminum phosphide, carbon disulfide, carbon tetrachloride, 1,3-dichloropropene and mixtures of 1,3-dichloropropene and 1,2-dichloropropene, dichloroethyl ether, ethylene dibromide, ethylene dichloride, hydrocyanic acid, orthodichlorobenzene, acrylonitrile, 3-chloro-2-methylpropene, trichloroethylene, 1,1,1-trichloroethane, monochloroacetonitrile, trichloroacetonitrile, 1,2-dichloropropane, 1,2-epoxypropane, 1,1-dichloro-1-nitroethane, 1,2-dibromo-3-chloropropane, 1-bromo-2-chloroethane, 3-bromo-1-chloropropene, 3-bromo-1-propyne, 1-chloro-2,3-epoxypropane, 1,2-dichloroethane, and tetrachloroethylene.

A large number of different solvents may be used for the preparation of solutions containing the above chemical treatment agents. The only requirement in choosing a solvent is that it be inert toward the chemical treatment agents.

The treatment agent may often be utilized in pure, undiluted form, or the treatment agent concentration may have as its upper limit the solubility of the chemical treating agent (or other ingredient of the chemical combination) in the particular solvent or solvent mixture used. However, the active treatment chemicals may be present over a wide range of concentrations below this limit without effecting the operability of the treatment method utilizing the chemically reactive closure described herein. Although the concentration of the active ingredient is not critical to the present method, the rate of the chemical interaction may be enhanced when high concentrations of the chemical agents are used.

In addition, the rate of the reaction between the closure means and the chemical agent, is partially dependent upon the physical characteristics of the closure means employed. For example, decreasing the radial dimensions or increasing the thickness of the closure will slow down the release of the treatment agent from the container. By varying these dimensions, personnel may effectively control the release of the chemical agent to ensure the safety of all those persons who must come into contact with the container prior to treatment.

U.S. Pat. Nos. 3,113,908 and 3,265,561 assigned to Schering A. G., Berlin, Germany, and 3,205,129 and 3,240,666 assigned to Morton Salt Company, Chicago, Ill., disclose various examples of typical solutions, mixtures or emulsions of known chemical fumigant pesticide agents combined with a variety of solvents, many of which would be suitable for use in carrying out the method of the instant invention. Accordingly, the above patents are incorporated by reference herein.

Figure 2:
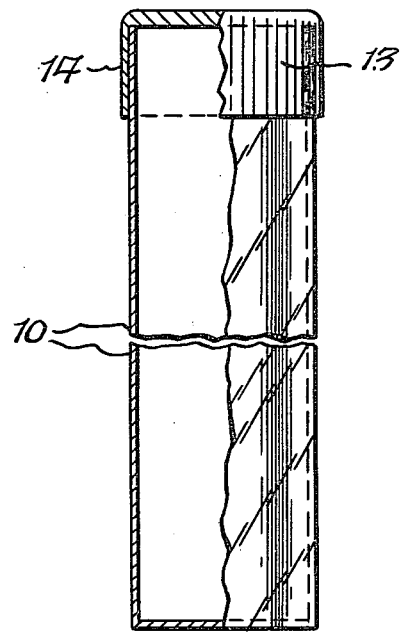
FIG. 2 is an elevated fragmentary vertical cross sectional view of an alternative embodiment of the sealed container.

Drawing FIG. 2 illustrates an alternate embodiment of the container and closure means wherein container 10 is open only at one end. The opposite end may be fabricated out of the same material as the container itself, or it may be fabricated from a different material so long as both the container and the closed bottom end are nonreactive to the chemical agent. The open end of the container 10 is sealed with cap 13 having a diameter slightly larger than the diameter of container 10 such that the peripheral circumferential edge of cap 13 completely surrounds and fits flush against the outer circumference of the open end of the container. Cap 13 is fabricated out of a suitable chemically reactive material.

The preferred cap is approximately 0.040 inches thick but this thickness may vary from between 0.025–0.50 inches. As stated above, further variations in the thickness of the cap may be made in order to either inhibit or speed up the rate of the chemical reaction.

The non-reactive container may be fabricated to any dimensions and the wall thickness may vary according to the intended use. However, the container tubes tested thus far have the preferred wall thickness of 0.013 inches which of course may vary plus or minus 0.003 inches between different manufacturers and materials. Again these dimensions are not critical to the successful practice of this inventive method.

Figure 3:
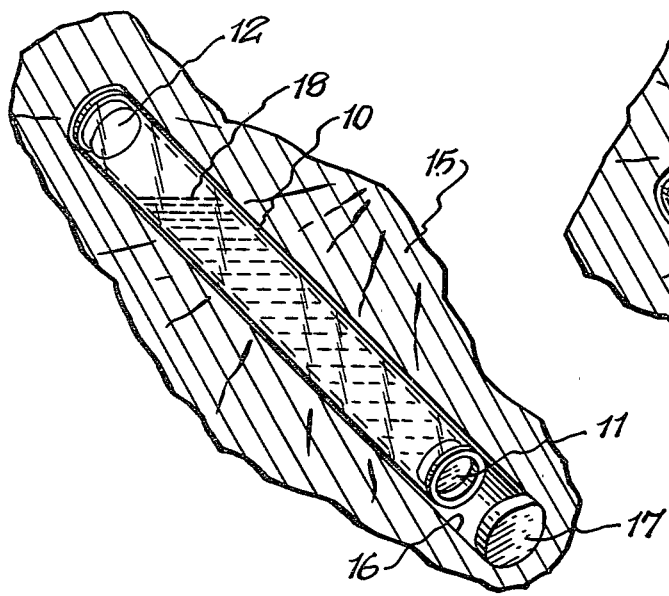
FIG. 3 is a perspective view of the sealed container of this invention in actual use confined within a wood structure positioned such that the chemically reactive closure means is in direct contact with the chemical treatment agent.

In carrying out the method of this invention, a choice of application techniques are available. FIG. 3 illustrates one method of application wherein an upwardly inclined hole 16 is bored through the wood structure 15 which is to be treated. Hole 16 may be formed by any suitable drill type device, and this opening forms a recess for confining container 10 enclosing the liquid treatment agent 18, wholly within the lateral confines of the wood structure as shown. A small, nonreactive plug, 17 is used to seal the bored hole at the surface of the wood structure in order to confine the vapors to the internal circulation of the wood structure. This plug may be made of any suitable material such as wood, cork or resistant plastic. Fluid 18 can be any chemical treatment agent or mixture of agents as disclosed above provided it is nonchemically reactive toward container 10, but is capable of interacting with closure means 11 or 12. The orientation of container 10 within the confined hole 16 is responsible for determining the rate of the reaction. As shown in FIG. 3 where chemically reactive cap 11 is positioned downwardly, the chemical solution is in direct contact with the cap and the rate of dissolution or degradation of cap 11 will be relatively quick, depending on the concentration of the chemical agent and the thickness of the cap wall.

Figure 4:
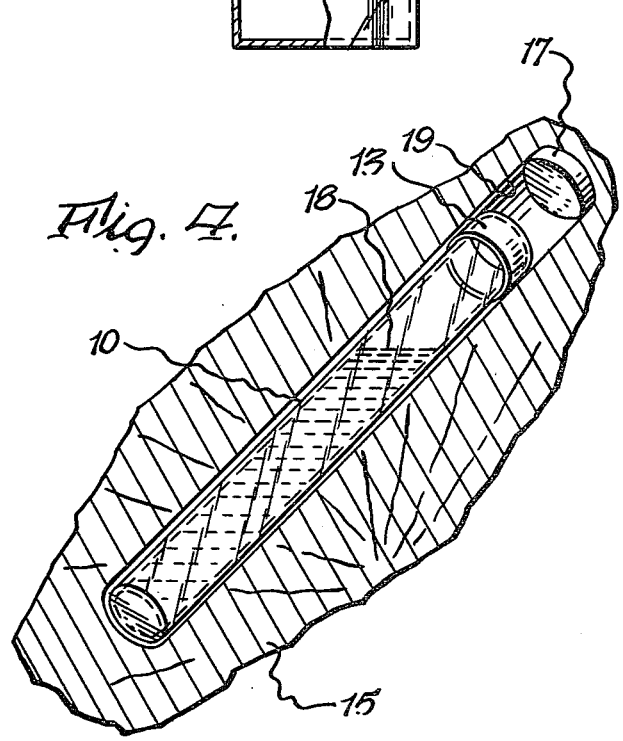
FIG. 4 is a perspective view of the sealed container of this invention in actual use confined within a wood structure positioned such that the chemically reactive closure means is in direct contact only with the vapors of the chemical treatment agent.

FIG. 4 illustrates the use of a container 10, having one open end sealed with a chemically reactive cap 13. The sealed container is shown confined within a downwardly directed hole 19 such that the sealed, reactive end of the container is located above the nonreactive end. With this orientation, the cap comes in contact only with the vapors of chemical agent 18, such that the rate of reaction will be considerably slower and more prolonged. The utilization of this method, therefore, provides for an essentially controlled rate of release of chemical agent depending upon the orientation of the container within the wood structure.

The following examples will serve to further illustrate the invention.

EXAMPLE I 45 mls of a solution of chloropicrin were enclosed within a plastic container approximately 9 inches long and having a ⅜ inch diameter which was fabricated from cellulose acetate having one end open. The open end of the container was then sealed using a cap made out of cellulose propionate. Both the cap and container were obtained by special order through a known commercial outlet. (Once sealed, the package has a limited shelf-life of approximately 6 to 72 hours depending upon ambient temperature.)

The sealed container was thereafter placed within a downwardly slanted, bored, hole which has been pre-drilled into a wooden bridge piling prior to treatment. The container was inserted so that the reactive end was downwardly directed, coming to rest at the bottom of the opening. To contain the vapors within the wood, a short, resistant cork plug was used to seal the bored hole at the wood surface. The temperature was maintained at about 70° F. In approximately 7 hours the chloropicrin was released into the internal structure of the wood piling.

EXAMPLE II

The procedure used was identical to that used in Example I, except the sealed container was placed inside the bored opening such that the nonreactive end of the container was at the bottom of the hole. The closure means was therefore only in contact with chloropicrin vapor. In approximately 72 hours, the chloropicrin vapors were released into the internal structure of the wood.

EXAMPLE III 50 mls of a water solution of another fumigant type fungicide, sodium N-methyl-dithiocarbamate (sold commercially under the trade names of WOOD FUME or VAPAM), were placed into a glass container. The container was then sealed with a closure means fabricated out of a thin, water-soluble polyvinyl alcohol film. The package was then enclosed within a wood piling using the procedure described in Example I. The fungicide was released in approximately 2 hours.

EXAMPLE IV 45 mls of a solution of still another fumigant fungicidal agent, comprising a combination of methyl-isothiocyanate and C3 chlorinated hydrocarbons commercially sold under the tradename VORLEX, was placed into a sealed container identical to that described in Example I. This package was then enclosed within a wood piling using the procedure described in Example I such that the closure means was in direct contact with the VORLEX. Utilizing this method, the closure had interacted with the treatment agent sufficiently to release the fungicide into the internal environment of the wood piling within approximately 5 hours.

EXAMPLE V

A similar package as that used in Example V containing a VORLEX solution was placed within a wood piling according to the procedure described in Example II. The package began releasing vapors into the internal circulation of the wood structure in approximately 36 hours.

A variety of wood structures can be chemically treated and preserved in accordance with the method of this invention, including both hardwood and softwood structures.

It is to be fully understood that all of the foregoing examples are intended to be merely illustrative and are not to be construed or interpreted as being restrictive or otherwise limiting of the present invention, accepting as set forth and defined in the hereto appended claims.

Various types of time delayed release packages are contemplated according to this method having various shapes and sizes. Although a rigid container has been described herein this method would also be applicable to nonrigid structures as for example a collapsible bag structure utilizing a plug or seal which is chemically reactive. In addition, it would be possible to enclose the chemical treating agent within a package that is entirely fabricated out of a reactive material, provided the package and its contents are not intended to be placed in storage for any appreciable length of time.

It should be further understood that all possible combinations of potential chemical treating agents and reactive closure materials have not been specifically described herein, as the selection of such materials will be dependent upon the individual behavior of a particular chemical and its ability to interact with each individual packaging material contemplated.

I claim:

1. In a method of applying a chemical treatment agent to a wood structure wherein a hole is formed within the wood structure to be treated and a container enclosing the treatment agent is positioned within the hole such that the container is substantially confined and enclosed within the wood structure, the improvement characterized by:

(A) placing the treatment agent into a container having at least one open end, which container is fabricated out of a material which is essentially non-reactive when placed in contact with said treatment agent or the vapors of said treatment agent, (B) sealing the open end of said container with a suitable closure means substantially fabricated out of a material which undergoes an interaction when contacted with said treatment agent or the vapors of said treatment agent, such that after a sufficient period of time has elapsed for the interaction to occur, an opening will spontaneously be provided through said closure means to permit the chemical treatment agent and vapors to pass out of said container and into the wood structure.

2. The method of claim 1 wherein said sealed container is positioned within the wood structure such that said closure means is in direct contact with the treatment agent.

3. The method of claim 1, wherein said sealed container is positioned within the wood structure such that said closure means is in direct contact solely with the vapors of said treatment agent.

4. The method of claim 1, wherein the material used for fabricating said non-reactive container is selected from the group consisting of glass, acetal homopolymers, cellulose acetate, nylon, diallylphthalate, polyethylene, polypropylene, and polyethylene/ethylene copolymers.

5. The method of claim 1 wherein the material utilized for fabricating the closure means is selected from the group consisting of acrylics, cellulose acetate butyrate, cellulose propionate, polycarbonate, polystyrene and polyvinyl alcohol.

6. The method of claim 1 wherein the chemical treatment agent is a fumigant insecticide selected from the group consisting of sodium N-methyl-dithiocarbamate, methyl isothiocyanate and methyl isothiocyanate combined with chlorinated $C_3$ hydrocarbons, cis-N-[1,1,2,2-tetrachloroethyl)thio]-4-cyclohexene-1,2-dicarboximide, chloropicrin (trichloronitromethane), aluminum phosphide, carbon disulfide, carbon tetrachloride, 1,3-dichloropropene and mixtures of 1,3-dichloropropene and 1,2-dichloropropene, dichloroethyl ether, ethylene dibromide, ethylene dichloride, hydrocyanic acid, orthodichlorobenzene, acrylonitrile, 3-chloro-2-methylpropene, trichloroethylene, 1,1,1-trichloroethane, monochloroacetonitrile, trichloroacetonitrile, 1,2-dichloropropane, 1,2-epoxypropane, 1,1-dichloro-1-nitroethane, 1,2 dibromo-3 chloropropane, 1-bromo-2-chloroethane, 3-bromo-1-chloropropene, 3-bromo-1-propyne 1-chloro-2,3-epoxypropane, 1,2-dichloroethane, and tetrachloroethylene.

7. The method of claim 1 wherein the container is fabricated out of a cellulose acetate, the closure means is fabricated out of cellulose propionate, and the chemical treatment agent is chloropicrin.

8. The method of claim 1 wherein the container is fabricated out of glass, the closure means is fabricated out of polyvinyl alcohol, and the chemical treatment agent is sodium N-methyldithiocarbamate.

9. The method of claim 1 wherein the container is fabricated out of cellulose acetate, the closure means is fabricated out of cellulose propionate and the chemical treatment agent is a combination of methyl isothiocyanate and methyl isothiocyanate combined with chlorinated $C_3$ hydrocarbons known commercially as VORLEX.

10. The method of claim 1 wherein said container is tube shaped and open at both ends.

11. The method of claim 10 such that the container is sealed at one end with a chemically non-reactive material, and sealed at the opposite end with a material which undergoes an interaction with said treatment agent or the vapors of said treatment agent.

12. A method for chemically treating wooden structural members which comprises:

(a) drilling a hole into said wooden member;

(b) inserting into the hole a sealed container enclosing a liquid chemical treatment agent, said container having a body and a closure means, said container body fabricated out of a material inert and nonreactive toward said liquid chemical treatment agent, said closure means fabricated out of a material which will undergo an interaction with said liquid chemical within a finite time, first to provide a temporary seal for said container and thereafter to release said liquid chemical, and (c) thereafter closing and sealing said hole.

13. The method of claim 1 wherein the treatment agent and materials for the container and closure means are selected and combined to produce a chemical degradation reaction.

14. The method of claim 1 wherein the treatment agent and materials for the container and closure means are selected and combined to produce a dissolution reaction.

15. The method of claim 12 wherein the treatment agent and materials for the container and closure means are selected and combined to produce a chemical degradation reaction.

16. The method of claim 12 wherein the treatment agent and materials for the container and closure means are selected and combined to produce a dissolution reaction.

* * * * *

UNITED STATES PATENT AND TRADEMARK OFFICE
CERTIFICATE OF CORRECTION

PATENT NO. : 4,344,250
DATED : August 17, 1982
INVENTOR(S) : George B. Fahlstrom It is certified that error appears in the above-identified patent and that said Letters Patent are hereby corrected as shown below:

Claim 2, line 3, insert --components of-- after "the" and before "treatment".

Signed and Sealed this

Twelfth Day of October 1982

[SEAL]

Attest:

Attesting Officer

GERALD J. MOSSINGHOFF
Commissioner of Patents and Trademarks